Dec. 11, 1923.

J. C. HEINTZ

VULCANIZER

Filed Sept. 9, 1920

1,477,174

Inventor
James C. Heintz
By Hull, Smith, Burd & West
Attys

Patented Dec. 11, 1923.

1,477,174

UNITED STATES PATENT OFFICE.

JAMES C. HEINTZ, OF LAKEWOOD, OHIO.

VULCANIZER.

Application filed September 9, 1920. Serial No. 409,115.

*To all whom it may concern:*

Be it known that I, JAMES C. HEINTZ, a citizen of the United States, residing at Lakewood, in the county Cuyahoga and State of Ohio, have invented a certain new and useful Improvement in Vulcanizers, of which the following is a full, clear, and exact description, reference being had to the accompanying drawings.

This invention relates to vulcanizers and is directed more particularly to a vulcanizer employing an electrically energized heating element in connection with a fluid tight chamber for effecting a heat suitable for the vulcanization of rubber or similar material.

Some of the objects of the present invention, are to provide a safety device for vulcanizers of the aforesaid character, which shall open the heating circuit should the automatic control fail to operate, and thus arrest the formation of steam under excessive pressure in the steam chamber; to provide a safety device which shall be simple in construction, inexpensive to manufacture and easily renewed, while further objects and advantages will become apparent as the description proceeds.

Figure 1:
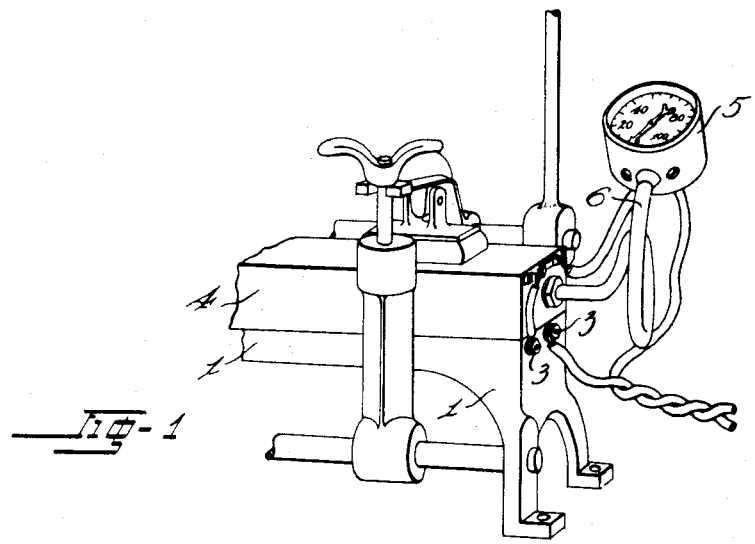
Figure 2:
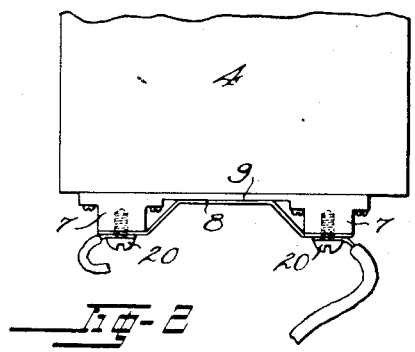
Figure 3:
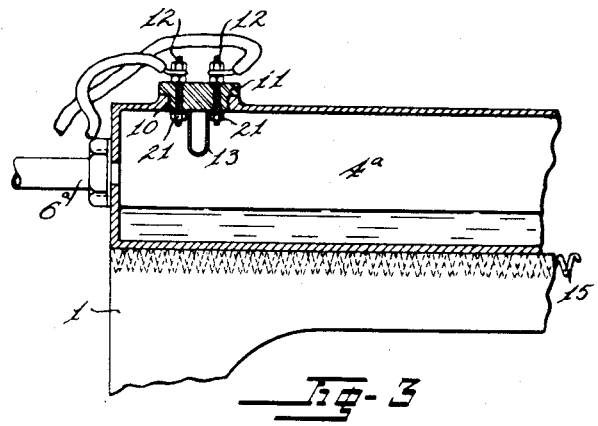
Figure 4:
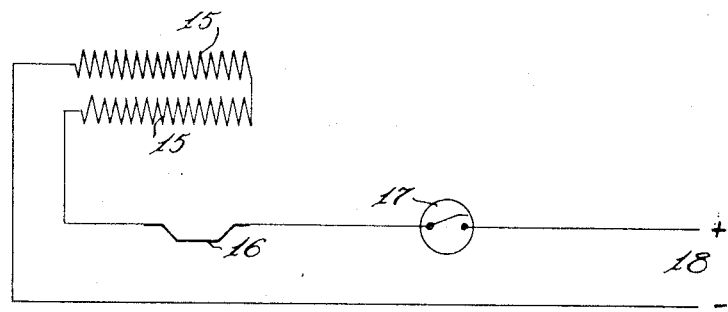

In the accompanying drawing wherein I have shown various illustrative embodiments of my invention, but without intent to limit myself thereto, Fig. 1 is a perspective view of a portion of a vulcanizer with my safety device attached thereto; Fig. 2 is a top plan view on an enlarged scale showing the device attached to the end portion of the steam chamber; Fig. 3 is an enlarged vertical sectional view of the steam chamber showing a modified form of the device attached thereto and Fig. 4 is a diagrammatic view of the electrical circuit.

Describing by reference characters, the various parts illustrated, 1 indicates a suitable support which also serves as a housing for the electrical heating element 2 shown in dotted lines in Fig. 3, and whose terminals only, are indicated at 3—3 in Fig. 1. An enclosed water and steam chamber 4 rests upon said support and is adapted to be heated by the heating element enclosed in the support 1. At one end of said chamber a combined steam gauge and circuit control 5 is attached by means of a pipe 6 and is adapted to break the electrical heating circuit when a predetermined steam pressure is reached and establish said circuit upon recession of the steam pressure, thus maintaining a constant temperature throughout the vulcanization period. Gauges of this type are common in the art and a detailed description of the construction of such is thought to be unnecessary at this time.

Secured to the surface of the steam chamber are a pair of spaced insulating members 7—7 which support a link 8 made of fusible material and adapted to melt at a predetermined temperature which is in excess of the vulcanizing temperature but less than a temperature and pressure which would be dangerous to said chamber. The link 8 is preferably so formed as to position a portion of it in direct contact with a thin sheet of insulating material 9 interposed between the link and the wall of the chamber and thus receive the heat by conduction, although it will be understood that the link could be positioned in direct contact with chamber or could be spaced therefrom and enclosed in a suitable casing and receive the heat by radiation.

In Fig. 3 I have shown a modification of the manner of subjecting the fusible link to the steam heat. In this figure the steam chamber $4^a$ is provided with a threaded opening 10 which receives a threaded insulating plug 11 provided with the spaced terminals 12—12 which support a U-shaped fusible link 13 on the interior of the chamber. In this form, the link is in direct contact with the steam.

The electrical circuit for each of said links is identical and is shown in detail in Fig. 4 wherein the heating element is indicated at 15, the fusible link at 16, and the automatic control at 17, all of said elements being connected in series circuit with a source of current which may be connected at 18.

In operation the vulcanizer is connected to the source of current which energizes the heating element which in turn heats the water in chamber 4 and generates steam under pressure. At a predetermined steam pressure as previously described, the automatic control opens and closes the electrical circuit to maintain a constant temperature. Should however the automatic control stick or otherwise fail to open the circuit, the heating will continue until such time as the fusing point of the safety link is reached when the circuit will be automatically opened by the melting of the link. When it is desired to renew the link shown in Figs. 1 and 2 it is only necessary to remove the screws 20—20 and affix a new link in position. With the type shown in Fig. 3, the plug 11 is unscrewed and the nuts 21—21 removed and a new link positioned thereon.

Having thus described my invention, what I claim is:—

1. In a vulcanizer, the combination with a fluid tight chamber, of an electrically energized heating element disposed in operative relation to said chamber, means for automatically opening and closing the heating element circuit at predetermined temperatures of said chamber and additional circuit opening means interposed in said circuit and operated by temperatures in excess of those for operating said automatic means.

2. In a vulcanizer, the combination with a fluid tight chamber, of an electrically energized heating element disposed in operative relation to said chamber, means dependent upon the fluid pressure within said chamber for controlling said heating element, and additional means dependent upon the heat of said chamber for controlling said heating element, said second controlling means being operative only in event of failure of said first mentioned control to operate.

3. In a vulcanizer, the combination with a fluid tight chamber, of an electrically energized heating element disposed in operative relation to said chamber, means interposed in said circuit for automatically maintaining said chamber at a predetermined temperature and a fusible link interposed in said circuit and adapted to open said circuit at a temperature higher than that required to operate said automatic means.

4. In a vulcanizer, the combination with a fluid tight chamber, of an electrically energized heating element disposed in operative relation to said chamber, means for automatically maintaining said chamber at a predetermined temperature, and a fusible link connected in the heating circuit and adapted to open said circuit at a temperature in excess of said predetermined temperature.

5. In a vulcanizer, the combination with a fluid tight chamber, of an electrically energized heating element disposed in operative relation to said chamber, means dependent upon the fluid pressure within said chamber for automatically controlling said heating element, and a fusible link connected in the heating circuit and exposed to the heat of said chamber, said link being adapted to fuse at a temperature in excess of that normally maintained by said automatic control thereby to open said heating circuit.

6. The combination with a fluid tight chamber adapted to be heated electrically, of means connected in the heating circuit for maintaining said chamber at a predetermined temperature, and additional means connected in said heating circuit and operated by the temperature of said chamber for opening said circuit at a temperature in excess of said predetermined temperature.

In testimony whereof, I hereunto affix my signature.

JAMES C. HEINTZ.